US012758810B2

(12) United States Patent
Harpool

(10) Patent No.: US 12,758,810 B2
(45) Date of Patent: Oct. 13, 2026

(54) ELECTRICAL ADAPTER FOR FIRE SUPPRESSION BOTTLE

(71) Applicant: Textron Aviation Inc., Wichita, KS (US)

(72) Inventor: Tanner David Harpool, Colwich, KS (US)

(73) Assignee: Textron Innovations Inc., Providence, RI (US)

( * ) Notice: Subject to any disclaimer, the term of this patent is extended or adjusted under 35 U.S.C. 154(b) by 308 days.

(21) Appl. No.: 18/515,904

(22) Filed: Nov. 21, 2023

(65) Prior Publication Data

US 2024/0165441 A1 May 23, 2024

Related U.S. Application Data

(60) Provisional application No. 63/384,460, filed on Nov. 21, 2022.

(51) Int. Cl.

*A62C 3/08* (2006.01)
*A62C 37/36* (2006.01)
*H01R 4/22* (2006.01)
*H01R 9/26* (2006.01)
*H01R 13/56* (2006.01)
*H01R 4/02* (2006.01)
(Continued)

(52) U.S. Cl.

CPC ................ *A62C 3/08* (2013.01); *A62C 37/04* (2013.01); *H01R 4/22* (2013.01); *H01R 9/2675* (2013.01); *H01R 13/567* (2013.01); *H01R 4/023* (2013.01); *H01R 4/5016* (2013.01); *H01R 4/5025* (2013.01); *H01R 9/226* (2013.01); *H01R 9/2416* (2013.01); *H01R 11/281* (2013.01); *H01R 11/284* (2013.01); *H01R 13/5213* (2013.01); *H01R 13/59* (2013.01); *H01R 13/595* (2013.01); *H01R 25/14* (2013.01); *H01R 25/16* (2013.01); *H01R 25/162* (2013.01); *H01R 25/168* (2013.01)

(58) Field of Classification Search

CPC .. A62C 3/08; A62C 37/04; H01R 4/22; H01R 9/2675; H01R 13/567; H01R 4/023; H01R 4/5016; H01R 4/5025; H01R 9/226; H01R 9/2416; H01R 11/281; H01R 11/284; H01R 13/5213; H01R 13/59; H01R 13/595; H01R 25/14; H01R 25/16; H01R 25/162; H01R 25/168

See application file for complete search history.

(56) References Cited

U.S. PATENT DOCUMENTS 5,162,616 A * 11/1992 Swaffield ............... H01R 25/14 174/70 B
5,314,345 A 5/1994 Cahaly et al.
(Continued)

FOREIGN PATENT DOCUMENTS

WO WO-9848496 A1 * 10/1998 ........... H01R 25/162

*Primary Examiner* — Justin M Kratt
(74) *Attorney, Agent, or Firm* — Avek IP, LLC

(57) ABSTRACT

A system for establishing an auxiliary electrical connection for an igniter configured to puncture a fire bottle. The system having an adapter configured to conceal an electrical connection of the igniter and electrically couple the concealed electrical connection to the auxiliary connection. The auxiliary connection preventing an improper connection being made to the igniter by having a different connection size than the electrical connections on the igniter.

20 Claims, 8 Drawing Sheets

(51) Int. Cl.

| | |
|---|---|
| *H01R 4/50* | (2006.01) |
| *H01R 9/22* | (2006.01) |
| *H01R 9/24* | (2006.01) |
| *H01R 11/28* | (2006.01) |
| *H01R 13/52* | (2006.01) |
| *H01R 13/59* | (2006.01) |
| *H01R 13/595* | (2006.01) |
| *H01R 25/14* | (2006.01) |
| *H01R 25/16* | (2006.01) |

(56) References Cited

U.S. PATENT DOCUMENTS

| | | | | |
|---|---|---|---|---|
| 6,203,342 | B1 * | 3/2001 | Gauker | H01R 13/7032 439/188 |
| 6,398,590 | B2 | 6/2002 | Banas et al. | |
| 6,910,902 | B2 | 6/2005 | Osada | |
| 2016/0344114 | A1 * | 11/2016 | Martinez | H01R 13/5213 |
| 2023/0280139 | A1 * | 9/2023 | Mason | C06C 5/06 102/204 |

* cited by examiner

ELECTRICAL ADAPTER FOR FIRE SUPPRESSION BOTTLE

CROSS-REFERENCE TO RELATED APPLICATIONS

This application claims the benefit of U.S. Provisional Patent No. 63/384,460 filed on Nov. 21, 2022, the entire contents of which are herein incorporated by reference.

BACKGROUND OF THE INVENTION

1. Field

The disclosed embodiments relate generally to the field of fire suppression. More specifically, the disclosed embodiments relate to the field of electrical connections made to fire suppression devices aircraft.

2. Description of the Related Art

U.S. Pat. No. 6,910,902 issued to Osada et al. describes a shunt for a squib having a securing mechanism. U.S. Pat. No. 5,314,345 issued to Cahaly et al. describes an electrical connection system including a squibb receiving socket designed to accommodate the terminal pins of the squibb. The publication also discloses a shunting element that short circuits the pins before a female connector on the electrical system is connected. U.S. Pat. No. 6,398,590 issued to Banas et al. discloses an alternative system for connecting squibb contacts with a firing system that does not allow for terminal confusion. U.S. Pat. No. 6,203,342 issued to Gauker et al. discloses an elaborate electrical squibb connection system utilizing a central pin and a ground plate.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a system including: an adapter for receiving an igniter, the igniter having a first post for accommodating a first electrical connection, and a second post for accommodating a second electrical connection, the second electrical connection having a polarity opposite the first electrical connection; the adapter being configured to at least partially conceal the second post; and a bus bar being electrically connectable to the second post on one side and extending through and out from the adapter to establish an auxiliary post using an auxiliary connector, the auxiliary post being a new electrical connection.

In some embodiments, the techniques described herein relate to a system wherein the first post and second post have the same size and the auxiliary post has a different size.

In some embodiments, the techniques described herein relate to a system wherein the first post and second post have the same diameter, and the auxiliary post has a different diameter.

In some embodiments, the techniques described herein relate to a system wherein the adapter includes a shell securable onto a cap.

In some embodiments, the techniques described herein relate to a system wherein the shell is made to be securable onto the cap by a snap fit.

In some embodiments, the techniques described herein relate to a system wherein the shell and cap are both substantially cylindrical and the shell includes a cutout and a first circumferential slot, the cutout being positioned such that the adapter shell does not intersect the first post and the first circumferential slot being on an opposite side of the shell from the cutout, the first circumferential slot allowing for passage of the bus bar from a connection to the second post to reach the auxiliary post outside of the adapter.

In some embodiments, the techniques described herein relate to a system including: an inwardly extending ledge at a bottom of the cap, the inwardly extending ledge configured to support a washer the washer having a hex body portion; an inside edge of the inwardly extending ledge defining an opening, the hex body portion of the washer extending down through the opening and enabling rotation of the washer by a tool.

In some embodiments, the techniques described herein relate to a system wherein the washer has an internal set of threads configured to accept an external set of threads on the second post.

In some embodiments, the techniques described herein relate to a system wherein a second circumferential slot in the cap is configured to align with the first circumferential slot in the shell when the adapter cap is snap fit over the adapter shell, an alignment of the first and second circumferential slots allowing passage of the bus bar from the inside of the adapter to the outside of the adapter.

In some embodiments, the techniques described herein relate to a system wherein the bus bar has a large substantially circular portion and a more narrow smaller portion, the large substantially circular portion being configured to be held inside the adapter, and the more narrow smaller portion being configured to extend outside of the adapter to the auxiliary post.

In some embodiments, the techniques described herein relate to a system wherein the large substantially circular portion includes a first hole and the more narrow smaller portion includes a second hole wherein the first hole is configured to receive the second post therethrough, and the second hole is configured to receive the auxiliary post therethrough.

In some embodiments, the techniques described herein relate to a system wherein the first post, auxiliary post, bus bar, and the washer are fabricated from conductive materials.

In some embodiments, the techniques described herein relate to an adapter wherein the adapter cap and the adapter shell are fabricated from an Ultem material.

In some embodiments, the techniques described herein relate to a method including: configuring a shell to receive a conductive element; configuring a conductive element to have first and second ends; configuring the first end to be received and secured into a bottom interior space of the shell; configuring the shell to have an aperture allowing the second end of the conductive element to pass through and be exposed outside of the shell to establish an auxiliary electrical connection; including an igniter in the shell; and concealing an electrical connector on the igniter using the shell and a lower cap element secured onto a bottom of the shell.

In some embodiments, the techniques described herein relate to a method including: establishing a new electrical connection on an auxiliary post having a size different than one or more other electrical connection members.

In some embodiments, the techniques described herein relate to a method including: configuring the lower cap element to snappingly receive and securely hold the bottom of the shell; and establishing a lateral opening in a lower portion of the lower cap element, the lateral opening allowing for the passage through and out of the second end of the conductive element upon a receipt of the shell into the lower cap element.

In some embodiments, the techniques described herein relate to a method including: forming one or more of the shell or lower cap element using 3D printing techniques.

In some embodiments, the techniques described herein relate to a method including: locating a threaded rotatable element in the lower cap element: accomplishing the concealing step using the threaded rotatable element.

In some embodiments, the techniques described herein relate to a system including: an adapter for receiving an actuating device, the actuating device configured to receive a first electrical connection and a second electrical connection; the adapter including a bus bar configured electrically couple the second electrical connection and an auxiliary electrical connection; the adapter being configured to at least partially conceal the second electrical connection; the auxiliary electrical connection having a first diameter and the second electrical connection having a second diameter.

In some embodiments, the techniques described herein relate to a system wherein the actuating device is an igniter a first electrical connector extending laterally from an igniter body and the second electrical connection is a second electrical connector which extends downwardly from the igniter body.

BRIEF DESCRIPTION OF THE SEVERAL VIEWS OF THE DRAWINGS

Illustrative embodiments are described in detail below with reference to the attached drawing figures, which are incorporated by reference herein and wherein.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments provide systems and a method for making an electrical connection to a pressurized fire suppression bottle system on aircraft.

The disclosed arrangement provides an adapter system for the usage of a fire bottle suppression adaptor. This adapter eliminates the potential of miswiring fire bottle cartridges which have commonly sized power and ground studs. For the fire extinguishing system to deploy, a cartridge squib must receive an electrical charge to puncture the bottle to emit the fire suppression agent. If the positive and negative wires are accidentally switched on the cartridge studs (as can happen when the studs are the same size as in conventional arrangements), the cartridge squib will not fire. This is a serious safety concern affecting the reliability of the aircraft. The potential for miswiring is high in current arrangements due to the rate at which cartridges and bottles must be serviced and/or replaced during the lifecycle of an aircraft. Each time the wires are disconnected and reconnected, the potential for switching the positive and negative (ground) wires is present.

Figure 1:
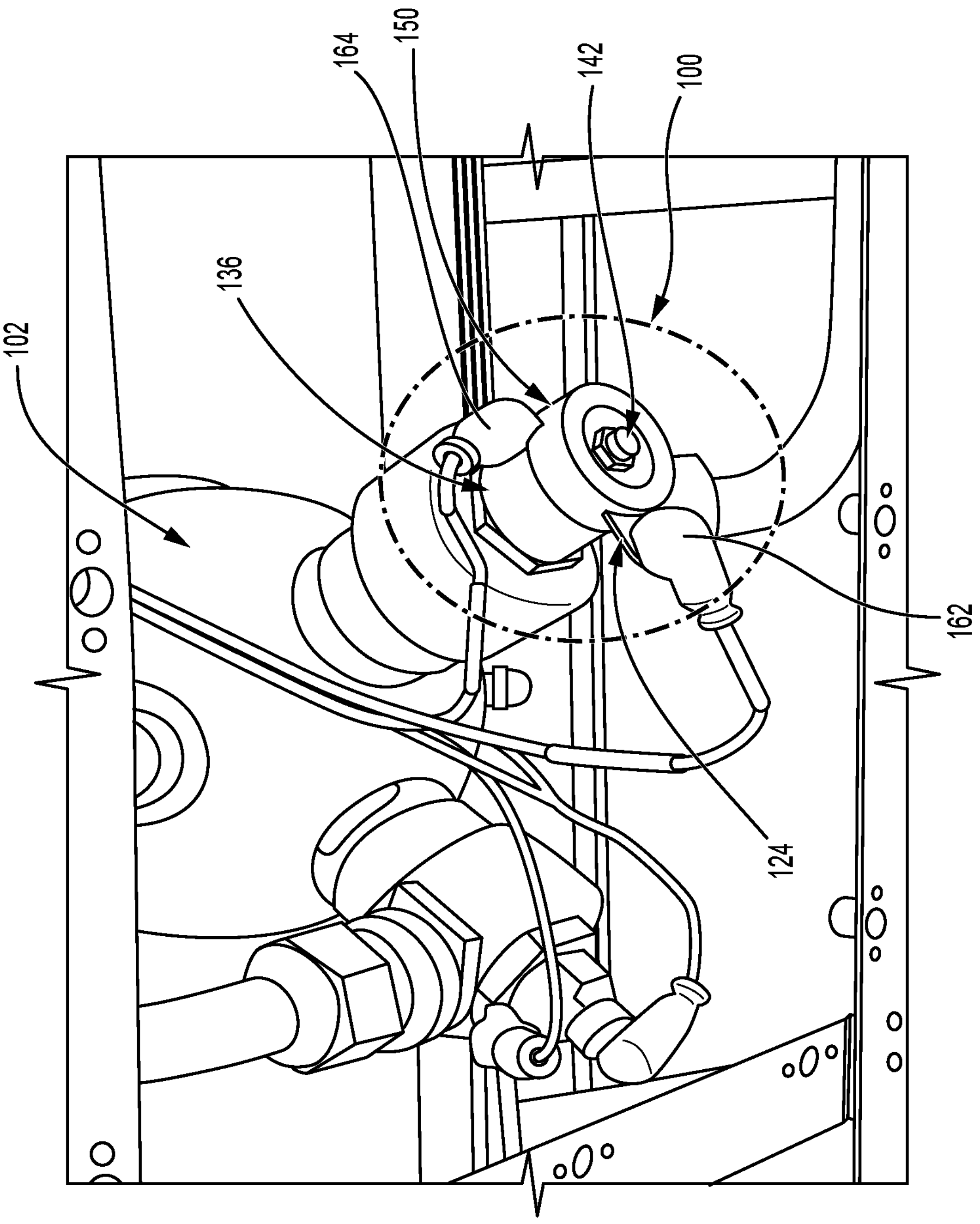
FIG. 1 is a perspective view of an embodiment of the adapter system which shows the assembled product connected to a fire suppression bottle using connector adaptors.
Figure 5:
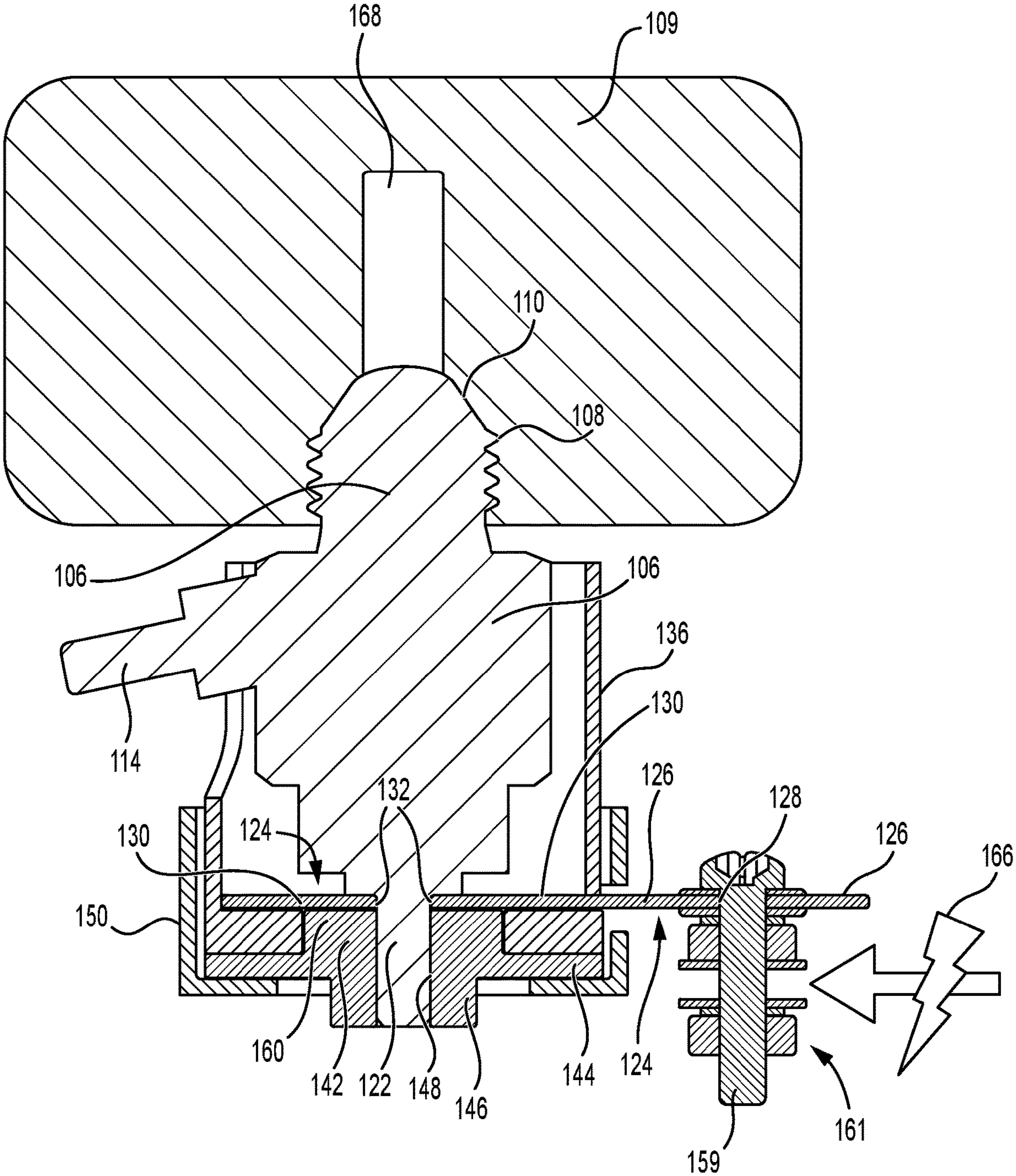
FIG. 5 is a cross-sectional view of the assembly of FIG. 4F as it appears after being connected into the fire bottle system and revealing the internal electrical connections made; and The drawing figures do not limit the invention to the specific embodiments disclosed and described herein. The drawings are not necessarily to scale, emphasis instead being placed upon clearly illustrating the principles of the invention.

The disclosed embodiments include an adapter device which eliminates the potential for miswiring by creating an electrical load pathway allowing the center stud of a fire bottle cartridge to be resized for adaptor attachment purposes. For example, with reference to adapter system 100 shown in FIG. 1 a fire bottle cartridge (squib) 106 is shown only partially (see FIG. 2; see also FIG. 3A for an exposed view). The squib 106 is threaded into the bottom of the discharge assembly 109 of the fire bottle 102 as shown in FIGS. 1 and 5 and may function as a type of actuation device or igniter. The squib 106 may be an igniter body. The squib 106, again referring to FIG. 3A, includes a threaded upper portion 108 which converges into a conical upper end 110 as the threaded region 108 is extending upward. Below the threaded upper end 108 the squib 106 expands to a hexagonal body 112. Jetting off laterally from the hexagonal body 112 is a cylindrical body 116 connecting to a first extending terminal/post 114. In embodiments, first extending post 114 comprises a negative connection terminal.

The term "post" as used herein should not be considered to any other configuration other than of a device that extends to enable a connection of some sort. The term should not be considered to limit a device to a particular shape, cross sectional, or an elongated profile.

Below the hexagonal body 112, extending in the opposite direction of the threaded upper end 108, a cylindrical portion 120 connects to a lower electrical connector 122 comprising the threaded positive connection in embodiments. The lower electrical connector 122, which is ordinarily directly received by a reciprocating connector to complete an electrical connection, will be electrically sealed off. More specifically, the implementation of an adapter shell 136 (FIG. 3C) and other components prevent the accomplishment of this conventional means of electrical connection. Conventionally, the two electrical connection bolts 122 and 114 are identically sized (have the same diameter). This has led to incorrect connections made where the positive terminal is received into the negative receptacle, and vice versa. The disclosed embodiments avoid this dilemma.

As a preliminary, squib 106 is presumed to already be installed on the aircraft. In normal operation, the squib 106, upon receiving electrical current, will detonate, puncturing the fire bottle 102 diaphragm and triggering release of the suppression agent from the fire bottle 102. The squib 106 may be an igniter body functioning as some type of igniter.

Figure 3A:
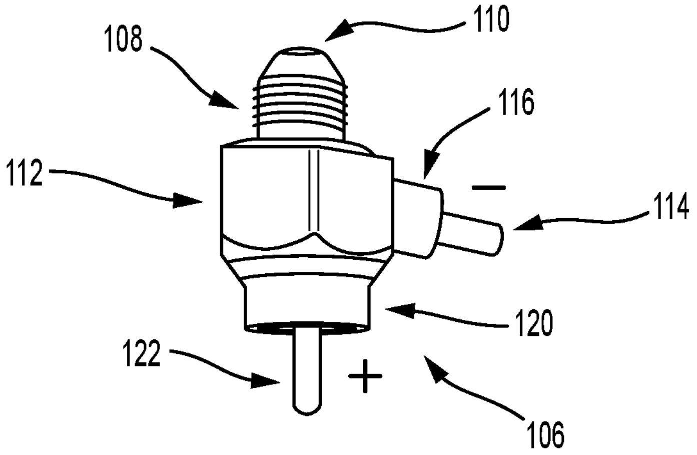
FIG. 3A is a side view of the squib.
Figure 3B:
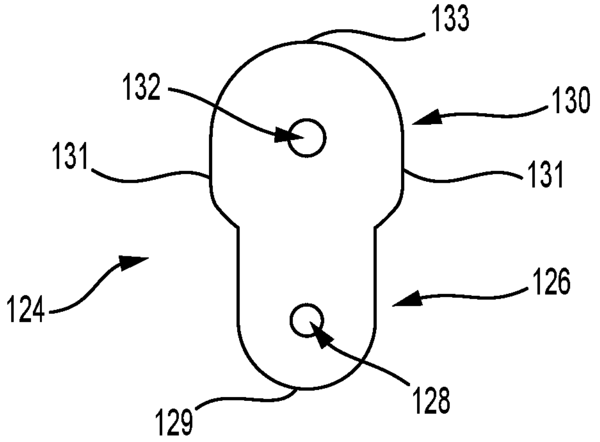
FIG. 3B is a top view of a bus bar implemented in embodiments.

FIG. 3B shows a bus bar 124 which is compact and, in embodiments, is fabricated from a conductive material. For example, 6061 T6 Aluminum may be used to construct the bus bar 124. Bus bar 124 includes a smaller portion 126 with a substantially circular edge 129 on one end and presents a circular hole 128 in the center of an established the half circle created from the relatively smaller portion 126 of the bus bar piece. The smaller portion 126 then transitions into a larger portion 130 which, although not circular, is greater diametrically than is smaller portion 126. Larger portion 130 presents a substantially circular curved edge 133 which extends out oppositely relative to the circular edge 129 of the smaller portion 126. A hole 132 similar to hole 128 already discussed is located in the center of the larger portion 130. Larger portion 130 is, in embodiments, is substantially semi-circular at edge 133, then transitions into opposing sides 131. The key-like shape of the bus bar 124, with a relatively large portion 130 and a relatively smaller portion 126 will ensure that the bus bar 124 cannot be removed or slid out after the system 100 is assembled by securing the larger portion 130 in the shell/cap assembly.

Figure 3C:
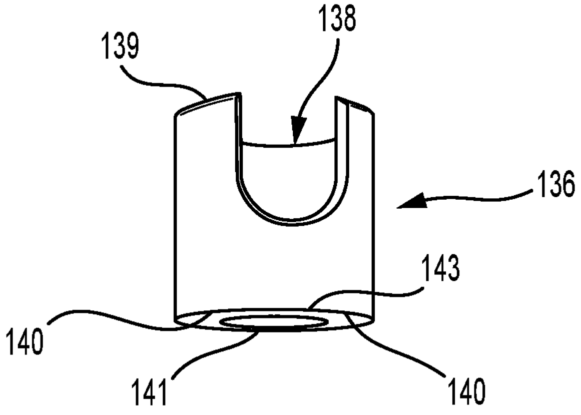
FIG. 3C is a side view of an adapter shell used in embodiments.

An adapter shell 136 is shown in FIG. 3C. In embodiments, the adapter shell 136 may be 3D printed from a fire-tolerant/fire-resistant material. In even more specific embodiments, the adapter shell 136 may be formed of an Ultem material which is a high strength plastic material with properties allowing it to withstand high temperature environments. These temperature resistant properties enable the adapter shell 136 to remain sound in the case of a fire on the aircraft. The adapter shell 136 is cylindrical in embodiments and is hollow throughout until its lower edge which includes a lower wall 140. The lower wall 140 extends from the lower edge inwards towards the center of the adapter shell 136 at an angle of approximately ninety degrees relative to the center axis of the adapter shell 136 creating an aperture 141 which is centered into lower wall 140 of the adapter shell 136.

Shell 136 further includes a lateral cutout 138. In embodiments, cutout 138 extends downward as a half-circle made into the cylindrical body of the shell 136. More specifically, the cutout 138 extends from a top edge 139 downwards towards the lower edge 143 of the adapter shell 136. A lower circumferential slot 158 (see FIG. 4A) cutout from the cylindrical adapter shell 136 is located directly above the lower edge 143 of the cylindrical shell 136 and is positioned on an opposite side of the shell relative to cutout 138. Slot 158 allows for the receipt of, and accepting therethrough of the larger portion 130 of the bus bar 124 when it is installed into the adapter shell 136. The positioning of the cutout 138 and the slot 158 enable securement of squib 106 within the adapter shell 136 ensuring that the smaller portion 126 of the bus bar 124 protrudes in a direction opposite the first extending post 114 and accommodates the negative stud on fit-up.

Figure 3D:
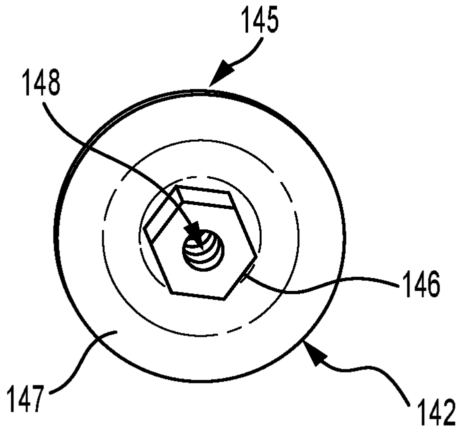
FIG. 3D is a top view of a washer nut utilized in embodiments.
Figure 3E:
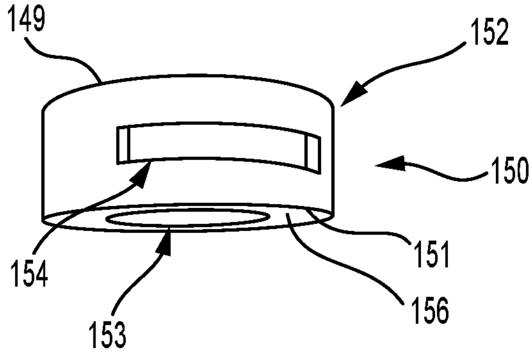
FIG. 3E is a side view of an adapter cap used in embodiments.

The adapter cap 150 shown in FIG. 3E is also, in embodiments, comprised of a fire-resistant/fire-tolerant material. In even more specific embodiments, the adapter cap 150 is 3-D printed from Ultem™ material.

The adapter cap 150, referring to FIG. 3E, includes a cylindrical shell 152 with an inwardly extending ledge 156 at the bottom edge of the cylindrical shell 152. Ledge 156 extends inwards at approximately ninety degrees to reduce the diameter of the hollow center of the cylindrical shell 152. The inside edge of the circular ledge 156 defines an aperture 153 which will be used to expose a hex body of a washer.

Also cutout from the cylindrical shell 152 is a circumferential slot 154 positioned in between the upper edge 149 and the lower edge 151 of the cap 150. The slot 154 allows for bus bar 124 insertion while the circular inwardly extending ledge 156 is necessary to hold a washer nut 142 in place. The adapter cap 150 and inwardly extending ledge 156 substantially hold the washer nut 142 in place.

The washer nut 142 shown in FIG. 3D is, in embodiments, made of a conductive material. In more specific embodiments, the washer nut 142 is made from 6061 T6 Aluminum. The washer nut 142 includes a circular disk base 144 having a first surface 145 shown in FIG. 4B, and a second surface 147 shown in FIG. 3D. The washer nut 142 includes a hexagonal body 146 atop the second surface 147 (FIG. 3D) and a cylindrical body 160 established atop the first surface 145. The hexagonal body 146 is positioned on the circular disk base 144 so that rotation may be provided by a wrench when a bolt is inserted through the center and rotated. In embodiments, the hexagonal body 146 may be a hex nut and is not structurally attached to the second surface 147 of the washer nut 142 so that the hexagonal body 146 may rotate independently of the washer nut 142. On the first surface 145 of the disk base 144 the cylindrical body 160 (see FIG. 5) protrudes away from the disk base 144 and is located with a center axis that aligns with the center of the hexagonal body 146. In the center of the hexagonal body 146 is a threaded hole 148 which extends through the disk base 144 and the cylindrical body 160 and is aligned with the rotatable hexagonal body 146. The washer nut 142 in embodiments may be placed onto the inwardly extending ledge 156 of the adapter cap 150 and serves a dual purpose of both threading the adapter cap 150 onto the cartridge squib 106 while providing the final means of electrical load path transfer from the power supply to the lower electrical connector 122.

Figure 3F:
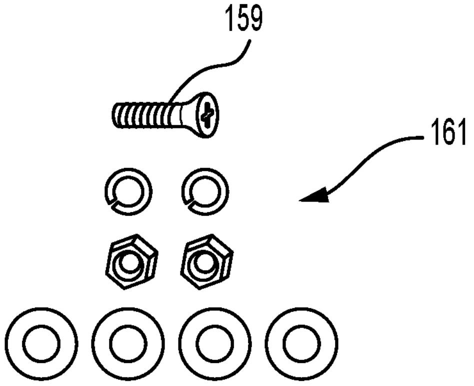
FIG. 3F is an overview of hardware which might be used for securement as well as other purposes in embodiments.

Hardware 161 as shown in FIG. 3F is utilized for proper assembly and installation of the embodiment and includes an auxiliary electrical connecting bolt 159 sized to insert into the circular hole 128 of the bus bar 124.

A method is also disclosed for assembling the adapter system 100 for use in a fire bottle arrangement.

Figure 4A:
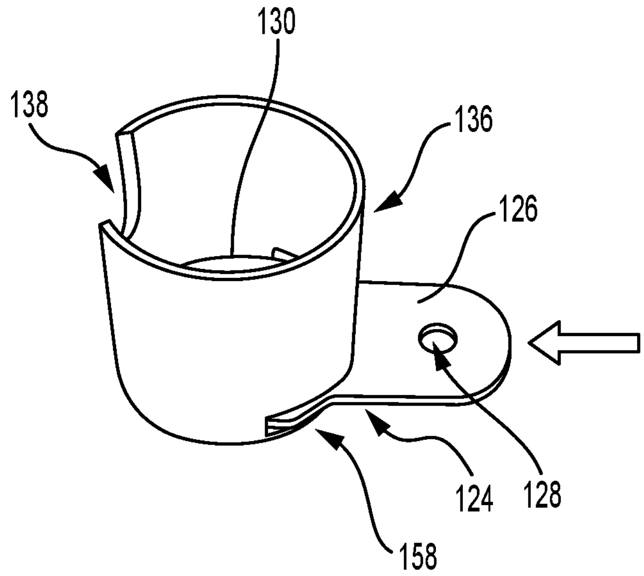
FIG. 4A is a perspective view of an embodiment where a larger side of the bus bar slides laterally into a slot on the cylindrical adapter shell 136.

In a first step shown in FIG. 4A, the larger portion 130 of the bus bar 124 is slid laterally into the slot 158 on the cylindrical adapter shell 136 until only the smaller portion 126 of the bus bar 124 is left protruding from the adapter shell 136.

Figure 4B:
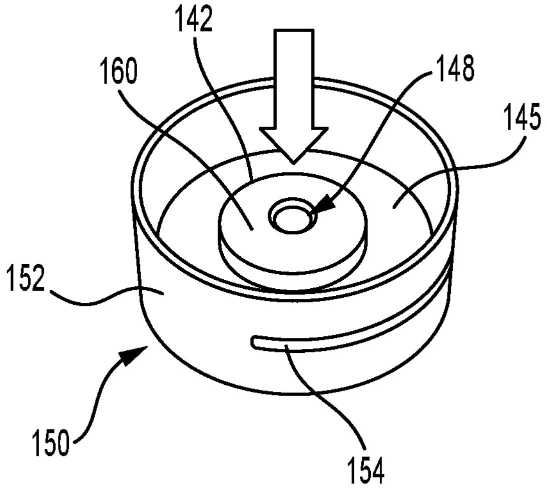
FIG. 4B is a perspective view of the adapter cap and a washer nut being placed in the cap in such a way that an inwardly extending ledge supports a washer nut in embodiments.

In a next step, shown in FIG. 4B, the washer nut 142 is dropped into the adapter cap 150 such that the inwardly extending ledge 156 (see FIG. 3E) supports the washer nut 142 within the adapter cap 150. The washer nut 142 is placed into the adapter cap 150 with the second surface 147 and the hexagonal body 146 of the washer nut 142 facing downwards (to appear as see FIG. 2) and the cylindrical body 160 of the first surface 145 facing upwards. FIG. 4B shows the washer nut 142 installed in adapter cap 150 after the washer nut 142 has been dropped into the adapter cap 150.

Figure 4C:
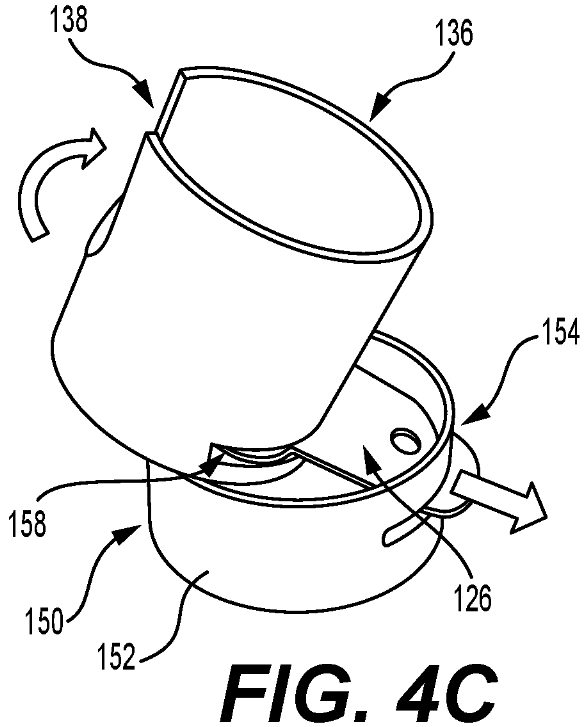
FIG. 4C is a perspective of the adapter shell 136 with the bus bar protruding from the side and being angled in such a manner that allows for the bus bar to be slid though the rectangular slot in the adapter cap in embodiments.
Figure 4D:
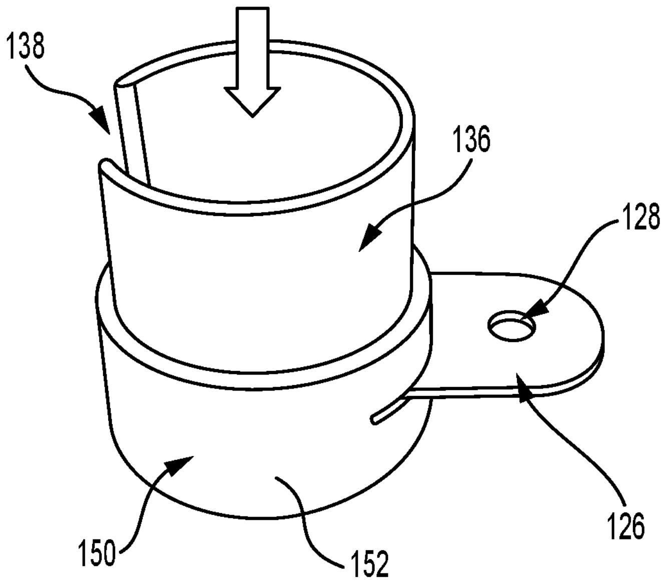
FIG. 4D is a perspective of an ideal bus bar position in embodiments where the bar is slid through the slot in the adapter cap.

In a next step shown in FIG. 4C, the adapter shell 136, with the bus bar 124 protruding from the side, is angled in such a manner that allows the bus bar 124 to be slid though the circumferential slot 154 made through the cylindrical shell 152 of the adapter cap 150 as shown. FIG. 4C shows the adapter shell 136 being oriented at an exemplary insertion angle for the bus bar 124 which enables the passage through slot 154. The bus bar 124 is slid through slot 154 as the adapter shell 136 is pushed down and angling to be upright inside the adapter cap 150. Once the adapter shell 136 reaches its lowest position inside the cap 150, there will be a “snap” that occurs. This is an indication that the adapter shell 136 is now locked in place and upright relative to the adapter cap 150 such that the two are coaxial. The snapping occurs because a snap fit has been established between the adapter cap 150 and the bottom of the adapter shell 136. If the “snap” does not occur, the adapter shell 136 may need to be pressed down for correct placement to occur. The snap fit is created when the bus bar 124 is inserted through the slot 154 of the adapter cap 150 while the adapter shell 136 is pressed down into the cap 150 simultaneously. The close tolerance between the adapter shell 136 and adapter cap 150 secures the components when snapped together. The correct placement of the elements following the “snap” is shown in FIG. 4D.

Figure 4E:
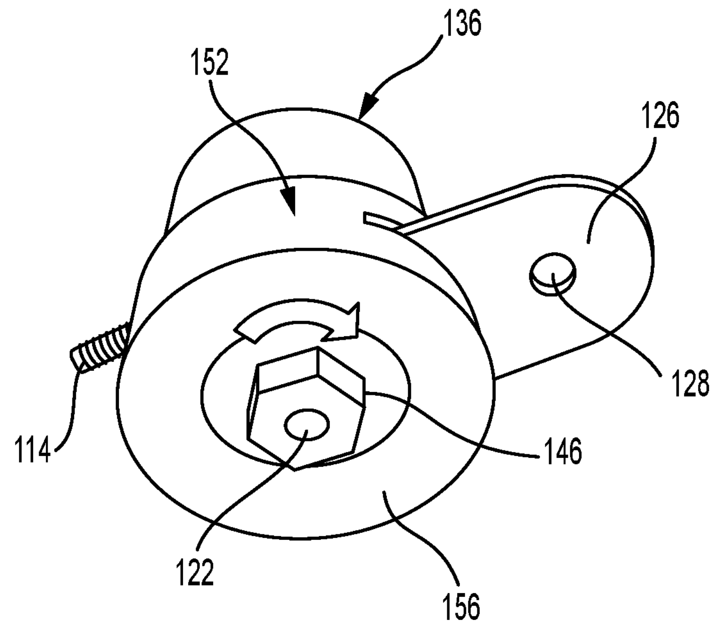
FIG. 4E is an underneath perspective of an embodiment after the squib has been dropped into the adapter shell and the laterally extending negative post of the squib is viewable through the cutout in the cylindrical shell of the adapter shell 136.
Figure 4F:
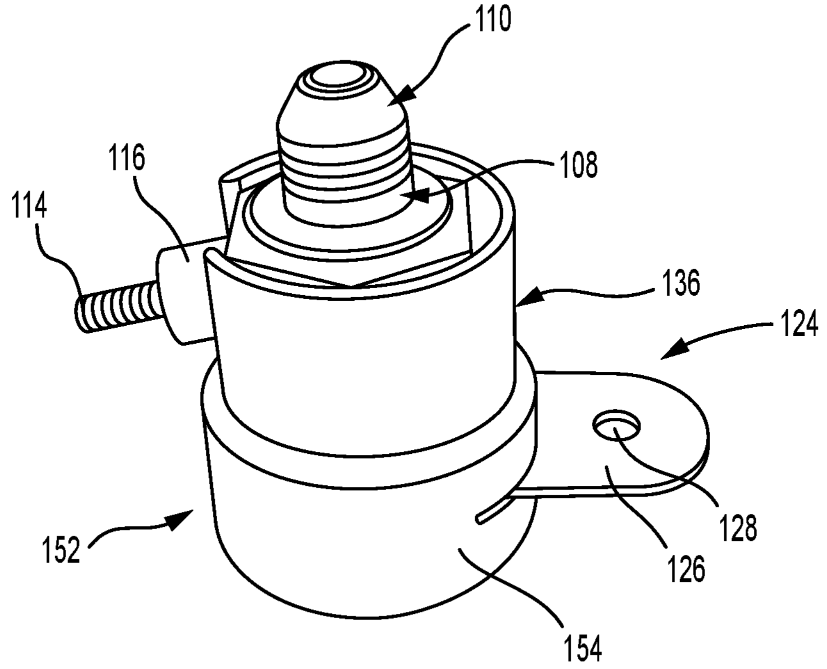
FIG. 4F is a perspective view of an embodiment of the completed assembly showing, in embodiments, a proper placement of the squib within the adapter shell, as well as the bus bar protruding through the slot in the adapter shell and slot in the adapter cap.

In a next step, the squib 106 is inserted and secured into the adapter shell 136. FIG. 4E shows the first extending post 114 of the squib 106 which includes the negative connection terminal positioned so that it protrudes through the cutout 138 of the cylindrical adapter shell 136. The lower electrical connector 122 inserts through the hole 132 on the larger portion 130 of the bus bar 124 which is aligned with the threaded hole 148 of the washer nut 142 configured within the adapter cap 150 such that the lower electrical connector 122 is threadingly receivable by internal threads existing inside the hexagonal body 146. The hexagonal body 146 is thus rotated to be screwed on to the lower electrical connector 122 of the squib 106 using a proper amount of torque, as can be seen in FIG. 4E. In embodiments, the lower electrical connector 122 of the squib 106 is electrically connected to the bus bar 124 due to the conductive properties of the washer nut 142. The connection allows current 166 (FIG. 5) to be delivered through bus bar 124 from the lower threaded electrical connector 122 to electrically activate the squib 106.

Figure 2:
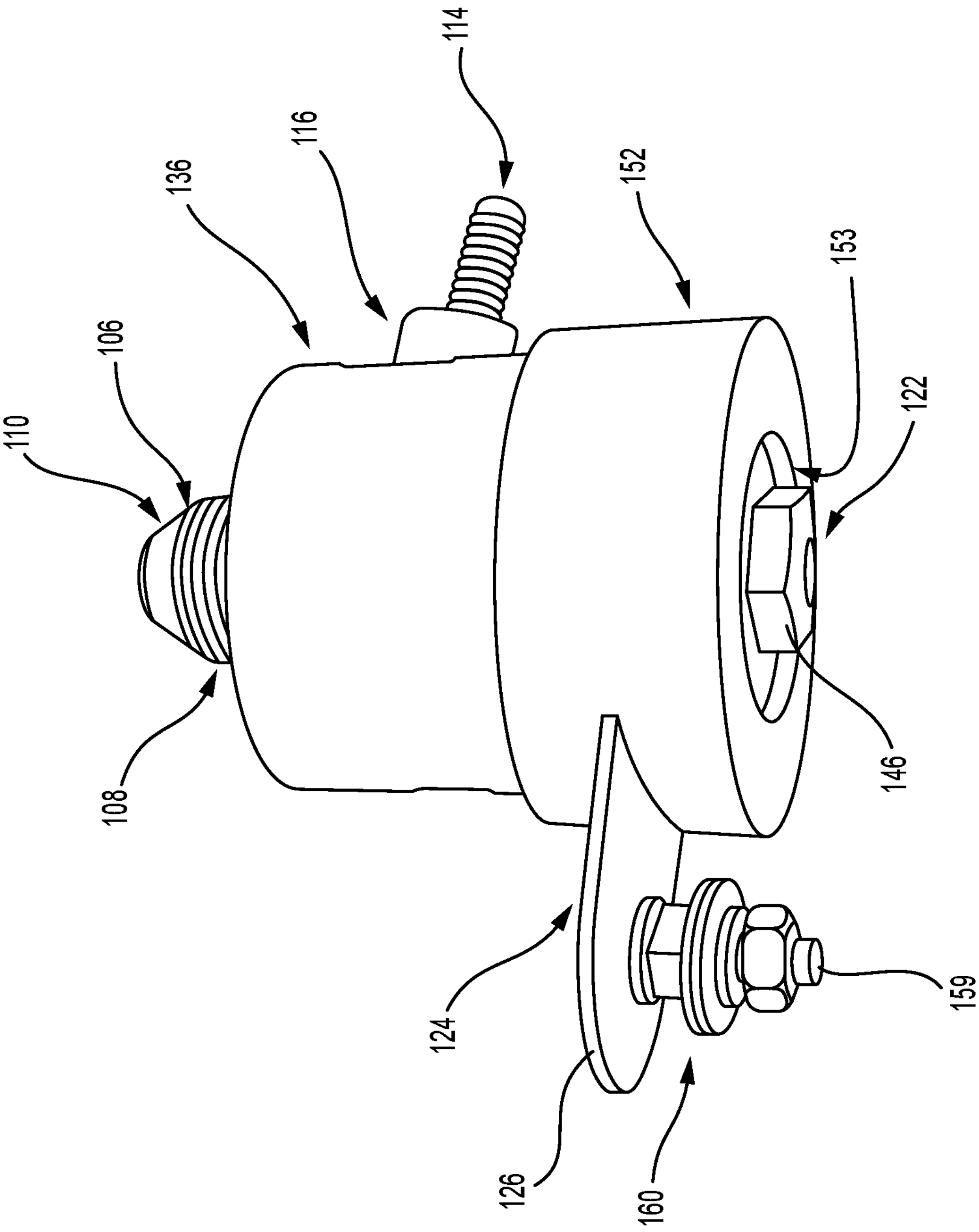
FIG. 2 is a side view of the product after assembly with hardware.

In a next step, auxiliary electrical connection bolt 159 is installed and passed through the circular hole 128 of the smaller portion 126 of the bus bar 124, as shown in FIG. 2. Hardware 161 may optionally be assembled onto bolt 159 which may serve as a positive connection terminal and may be a new electrical connection.

In a next step, wire connector 162 (see FIG. 1) is sized or otherwise configured to receive the auxiliary bolt 159 and consequently does not properly fit the other connecting bolt/terminal 114. In embodiments, bolt 159 has a first size (e.g., diameter), which makes it connectable onto the positive connection terminal in place of the connector 122 which has been concealed (see FIG. 4E). A first wire connector 164 having a second size, which in embodiments is relatively large, is received by the first extending post 114 serving as the negative connection terminal. The bolt 159, in embodiments, is a replacement of the concealed post 122 and is electrically connected to the lower electrical connector 122 of the squib 106 and completes the necessary circuit. Since, the two electrical connections into the squib 106 (i.e. first extending post 114 and auxiliary post bolt 159) each have different sizes (e.g., diameters) each can only accept one of the two differently sized wire connectors 162 and 164. Thus, the wire connectors 162 and 164 are only able to be attached to the squib 106 in one way. The adapter system 100 may then receive a current or power from an aircraft to allow the squib 106 to puncture the fire bottle 102.

FIG. 5 is a section taken down the middle of the adapter system 100 after installation to the fire bottle 102. Referring to the figure, current 166 (e.g. 3 amp, 28V power/as required) is able to be supplied via the second wire connector 162 to the auxiliary bolt 159 (i.e. the second extending post) passing through the smaller portion 126 of the bus bar 124. The current 166 then travels from the smaller portion 126 to the larger portion 130 of the bus bar 124 and into the threaded bolt connector 122 of the squib 106. The diametric tolerances created in each of the circular holes 128 and 132 (in bus bar 124) are made to be slightly larger than the diameter of the threads on the bolt 159 and the lower electrical connector 122 of the squib 106. The current 166 flows from the bus bar 124 into the washer nut 142 which transfers the current 166 through the threads of the threaded hole 148 into the lower electrical connector 122 of the squib 106. The auxiliary bolt 159, bus bar 124, washer nut 142, and lower electrical connector 122 create an electrical connection between the source of current 166 and the squib 106. In embodiments, the current 166 source may be an aircraft auxiliary power unit, When commanded, electrical current 166 (with the correct polarity) may be supplied to the bolt 159 which travels through the adapter system 100 and actuates the squib 106, triggering mechanisms to puncture the fire bottle 102 diaphragm to trigger release of fire suppression agent within the fire bottle 102. In embodiments, a pyrotechnic plug 168 may be actuated by the squib 106 to release and puncture the fire bottle 102 so fire suppression agent may be released.

The auxiliary bolt 159 inserted through the bus bar 124 serves as the second extending post and is sized to be one size smaller in diameter than the diametrically equal first extending post 114 and the lower electrical connector 122 on the squib 106. The size difference established by the bus bar 124, connected bolt 159, and the first extending post 114 prevents a user from incorrectly connecting the diametrically different second wire connector 162 and first wire connector 164. The difference in size will prevent an improper electrical connection because coupling between the first wire connector 164 and the auxiliary bolt 159 (i.e. second extending post) and the second wire connector 162 and the first extending post 114 is not allowed. The adapter system 100 makes the lower electrical connector 122 inaccessible and coverts the lower electrical connector 122 to a smaller terminal size by creating a second extending post using the bus bar 124 and the bolt 159. The converted terminal size of the bolt 159 allows the second extending post (i.e. the bolt 159) to have a different diameter than the first extending post 114 which allows for the diametrically different wire connectors 162 and 164 to only be installed in one way and substantially prevents improper connection from occurring.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system comprising:

an adapter for receiving an igniter, the igniter having a first post for accommodating a first electrical connection, and a second post for accommodating a second electrical connection, the second electrical connection having a polarity opposite the first electrical connection;

the adapter being configured to at least partially conceal the second post; and a bus bar being electrically connectable to the second post on one side and extending through and out from the adapter to establish an auxiliary post using an auxiliary connector, the auxiliary post being a new electrical connection;

wherein:

the first post and the second post are substantially similar in appearance; and the concealing of the second post by the adaptor blocks the second post from making physical connection with any components other than the adaptor and prevents electrical connection between the second post and components other than the bus bar.

2. The system of claim 1, wherein the first post and second post have the same size and the auxiliary post has a different size.

3. The system of claim 2, wherein the first post and second post have the same diameter, and the auxiliary post has a different diameter.

4. The system of claim 1, wherein the adapter includes a shell securable onto a cap.

5. The system of claim 4, wherein the shell is made to be securable onto the cap by a snap fit.

6. The system of claim 4, wherein the shell and cap are both substantially cylindrical and the shell includes a cutout and a first circumferential slot, the cutout being positioned such that the adapter shell does not intersect the first post and the first circumferential slot being on an opposite side of the shell from the cutout, the first circumferential slot allowing for passage of the bus bar from a connection to the second post to reach the auxiliary post outside of the adapter.

7. The system of claim 6, further comprising:

an inwardly extending ledge at a bottom of the cap, the inwardly extending ledge configured to support a washer having a hex body portion; and an inside edge of the inwardly extending ledge defining an opening, the hex body portion of the washer extending down through the opening and enabling rotation of the washer by a tool.

8. The system of claim 7, wherein the washer has an internal set of threads configured to accept an external set of threads on the second post.

9. The system of claim 7, wherein the first post, auxiliary post, bus bar, and the washer are fabricated from conductive materials.

10. The system of claim 6, wherein a second circumferential slot in the cap is configured to align with the first circumferential slot in the shell when the adapter cap is snap fit over the adapter shell, an alignment of the first and second circumferential slots allowing passage of the bus bar from the inside of the adapter to the outside of the adapter.

11. The system of claim 10, wherein the bus bar has a large substantially circular portion and a more narrow smaller portion, the large substantially circular portion being configured to be held inside the adapter, and the more narrow smaller portion being configured to extend outside of the adapter to the auxiliary post.

12. The system of claim 11, wherein the large substantially circular portion includes a first hole and the more narrow smaller portion includes a second hole wherein the first hole is configured to receive the second post therethrough, and the second hole is configured to receive the auxiliary post therethrough.

13. The adapter of claim 4, wherein the adapter cap and the adapter shell are fabricated from an Ultem material.

14. A method comprising:

configuring a shell to receive a conductive element;

configuring a conductive element to have first and second ends which are substantially similar in appearance;

configuring the first end to be received and secured into a bottom interior space of the shell;

configuring the shell to have an aperture allowing the second end of the conductive element to pass through and be exposed outside of the shell to establish an auxiliary electrical connection; including an igniter in the shell; and concealing an electrical connector on the igniter using the shell and a lower cap element secured onto a bottom of the shell such that physical connections between the second end and other components is blocked and the electrical connector cannot form electrical connections other than the auxiliary electrical connection.

15. The method of claim 14, further comprising: establishing a new electrical connection on an auxiliary post having a size different than one or more other electrical connection members.

16. The method of claim 14, further comprising:

configuring the lower cap element to snappingly receive and securely hold the bottom of the shell; and establishing a lateral opening in a lower portion of the lower cap element, the lateral opening allowing for the passage through and out of the second end of the conductive element upon a receipt of the shell into the lower cap element.

17. The method of claim 16, further comprising: forming one or more of the shell or lower cap element using 3D printing techniques.

18. The method of claim 16, further comprising: locating a threaded rotatable element in the lower cap element and accomplishing the concealing step using the threaded rotatable element.

19. A system comprising:

an adapter for receiving an actuating device, the actuating device configured to receive a first electrical connection and a second electrical connection, where the first electrical connection and the second electrical connection are substantially similar in appearance;

wherein:

the adapter comprises a bus bar configured to electrically couple the second electrical connection and an auxiliary electrical connection;

the adapter is configured to at least partially conceal the second electrical connection; and the auxiliary electrical connection has a first diameter and the second electrical connection has a second diameter; and the concealing of the second electrical connection by the adaptor blocks the second electrical connection from making physical connection with any components other than the adaptor and prevents an electrical connection between the second electrical connection and components other than the bus bar.

20. The system of claim 19, wherein:

the actuating device is an igniter comprising a first electrical connector extending laterally from a body of the igniter; and the second electrical connection is a second electrical connector which extends downwardly from the igniter body.

* * * * *